US011255664B2

(12) United States Patent
Cutri et al.

(10) Patent No.: US 11,255,664 B2
(45) Date of Patent: Feb. 22, 2022

(54) METHOD FOR ESTIMATING THE DIRECTION OF MOTION OF AN INDIVIDUAL

(71) Applicant: GIPSTECH S.R.L., Rende (IT)

(72) Inventors: Giuseppe Cutri, Rende (IT); Luigi D'Alfoso, Rende (IT); Gaetano D'Aquila, Rende (IT); Giuseppe Fedele, Rende (IT)

(73) Assignee: GIPSTECH S.R.L., Rende (IT)

( * ) Notice: Subject to any disclaimer, the term of this patent is extended or adjusted under 35 U.S.C. 154(b) by 524 days.

(21) Appl. No.: 16/085,031

(22) PCT Filed: Mar. 16, 2017

(86) PCT No.: PCT/IT2017/000054
§ 371 (c)(1),
(2) Date: Sep. 14, 2018

(87) PCT Pub. No.: WO2017/158633
PCT Pub. Date: Sep. 21, 2017

(65) Prior Publication Data
US 2020/0333137 A1    Oct. 22, 2020

(30) Foreign Application Priority Data

Mar. 17, 2016  (IT) .................. 102016000028116

(51) Int. Cl.
| | |
|---|---|
| *G01C 1/00* | (2006.01) |
| *G01C 17/02* | (2006.01) |
| *G01P 15/08* | (2006.01) |
| *G06F 17/16* | (2006.01) |
| *G06F 17/18* | (2006.01) |

(52) U.S. Cl.
CPC ............ *G01C 1/00* (2013.01); *G01C 17/02* (2013.01); *G01P 15/08* (2013.01); *G06F 17/16* (2013.01); *G06F 17/18* (2013.01)

(58) Field of Classification Search
CPC .......... G01C 1/00; G01C 17/02; G01C 21/12; G01P 15/08; G06F 17/16; G06F 17/18
See application file for complete search history.

(56) References Cited

U.S. PATENT DOCUMENTS

| | | | |
|---|---|---|---|
| 10,944,766 B2 * | 3/2021 | Mishra ................ | G06F 21/552 |
| 2012/0136573 A1 * | 5/2012 | Janardhanan ......... | G01C 21/20 |
| | | | 701/512 |
| 2013/0053005 A1 * | 2/2013 | Ramer ............... | G06Q 30/0256 |
| | | | 455/414.1 |

(Continued)

FOREIGN PATENT DOCUMENTS

WO    2014025429    2/2014

OTHER PUBLICATIONS

International Search Report and Written Opinion for Corresponding International Application No. PCT/IT2017/000054 (14 Pages) (Jun. 26. 2017).

(Continued)

*Primary Examiner* — Stephanie E Bloss
(74) *Attorney, Agent, or Firm* — Lucas & Mercanti, LLP

(57) ABSTRACT

The present invention relates to a method for estimating the value of the angle of the direction of motion or of the walk of a person who carries a device capable of measuring the basic quantities related to his/her own inertia such as a common smartphone. The device is capable of measuring for example acceleration and angular rotation and to determine its orientation relative to Magnetic North. The estimation method in question is particularly suitable for estimating the direction angle of the individual's motion regardless of how the individual carries the device able to measure the main inertial quantities and consequently this method solves the problem of the determination of the relative attitude between the reference system of the carried device and the user reference system that moves within a generic absolute reference system.

9 Claims, 7 Drawing Sheets

(56) References Cited

U.S. PATENT DOCUMENTS

| | | | | |
|---|---|---|---|---|
| 2013/0185018 A1* | 7/2013 | Sheng | ............... | G01B 7/003 |
| | | | | 702/153 |
| 2013/0311133 A1 | 11/2013 | Kordari et al. | | |
| 2013/0311134 A1* | 11/2013 | Kordari | ............... | G06F 17/10 |
| | | | | 702/160 |
| 2015/0042812 A1* | 2/2015 | Tang | ............... | G06K 9/00342 |
| | | | | 348/157 |
| 2016/0097788 A1* | 4/2016 | Looze | ............... | G01P 13/02 |
| | | | | 702/141 |

OTHER PUBLICATIONS

Chan et al. "Algorithms for Computing the Sample Variance: Analysis and Recommendations", The American Statistician, 1983, vol. 37, No. 3, pp. 242-247.
Markley et al., "Fundamentals of Spacecraft Attitude Determination and Control", Space Technology Library, 2014, pp. 1-486.
Kuipers, "Quaternions and Rotation Sequences A Primer with Applications to Orbits. Aerospace, and Virtual Reality", Princeton University Press, 1999, pp. 1-389.
Ling, "Comparison of Several Algorithms for Computing Sample Means and Variances", Journal of the American Statistical Association, 1974, vol. 69, No. 348, pp. 859-866.
Madgwick, "Estimation of IMU and MARG orientation using a gradient descent algorithm", IEEE International Conference on Rehabilitation Robotics : [proceedings], 2011, pp. 1-33.
Mohssen et al., "It's the Human that Matters: Accurate User Orientation Estimation for Mobile Computing Applications", Conference Paper, 2014, pp. 1-11.
Luczak et al., "Sensing Tilt With MEMS Accelerometers", IEEE Sensors Journal, 2006, vol. 6, No. 6, pp. 1669-1675.

* cited by examiner

METHOD FOR ESTIMATING THE DIRECTION OF MOTION OF AN INDIVIDUAL

CROSS-REFERENCE TO RELATED APPLICATIONS

This application is a 371 of PCT/IT2017/000054, filed Mar. 16, 2017 which claims the benefit of Italian Patent Application No. 102016000028116, filed Mar. 17, 2016.

FIELD OF THE INVENTION

The present invention relates to a method for the estimation of the direction of motion of an individual or an object.

BACKGROUND OF THE INVENTION

In particular, the present invention relates to a method for estimating the value of the angle of the direction of motion or of the walk of a person who carries a device capable of measuring the basic quantities related to his/her own inertia such as a common smartphone. Said a device is capable of measuring for example acceleration and angular rotation and to determine its orientation relative to Magnetic North. The estimation method in question is particularly suitable for estimating the direction angle of the individual's motion regardless of how the individual carries the device able to measure the main inertial quantities and consequently this method solves the problem of the determination of the relative attitude between the reference system of the carried device and the user reference system that moves within a generic absolute reference system.

STATE OF PRIOR ART

In the present description a vector v is characterized by a length |v|, an axis passing through it and a direction. Therefore, +v and −v have the same axis and length, but opposite directions. Note that if v is on a plane then its angle with respect to a reference axis uniquely describes the axis and the direction of v if the angle is in the range [0,2π), it describes only the axis of v if the angle is in a range of π radians with an ambiguity on the direction.

When an individual carrying a device for measuring the inertia has to be identified within an absolute three-dimensional coordinates system, then it is necessary to determine the transformations that allow to perform the necessary reference system changes between three-dimensional reference vectors measured respectively within:
1. An absolute reference system that can for example correspond to the reference system NED (North, East, Down) shown in FIG. 1a and FIG. 1b;
2. A reference system of the individual where an axis of said reference system is assumed always oriented in the motion direction (FIG. 1c); and
3. A device reference system for the device carried by the individual (FIG. 1d). By "carried" is meant throughout the present description and in the appended claims that the device is integral to the individual in terms of speed (instantaneous or average) but can rotate with respect to the reference system of the individual.

During the individual walk, the necessary transformations, at each time instant, to align said three reference systems allow to solve the problem of the determination of the individual's axis and direction of motion.

Referring to the scenario that includes an individual carrying the device for the dynamic movement measurement within an indoor or outdoor space, there are several traditional methods that allow to determine the attitude of the device, allowing to solve the problem of aligning said device reference system to said absolute reference system. The traditional method described by SOH Madgwick et al. in "*Estimation of IMU and MARG orientation using a gradient descent algorithm*", published in Proceedings of the IEEE International Conference on Rehabilitation Robotics (I corr), 2011, ISBN 978-1-4244-9863-5 describes how it is possible to determine the attitude of an inertia measurement device equipped with a triaxial accelerometer, a triaxial gyroscope and a triaxial magnetometer referring the aligning within a NED absolute reference frame. This attitude is normally expressed through different, similar and interchangeable mathematical formalisms such rotation matrices, quaternions, or using Euler angles, for example the angles triple termed roll, pitch and yaw. With reference to FIG. 4, a three-dimensional vector expressed in the device reference system, after having being rotated through the roll and pitch angles so as to lie on the horizontal plane $X_aY_a$ of said absolute reference system, can be completely aligned to said system by completing the rotation through the use of the yaw angle ψ indicated in the Figure. The angle ψ essentially expresses the orientation of the device around the axis of gravity, estimated with respect to axis $X_a$ of the absolute reference system, which by definition is aligned with the North (FIG. 2).

The direction of motion is however not generally coinciding with this angle ψ, but differs from it by an angle θ (FIG. 4). A need therefore remains to determine the unknown angle θ so as to obtain the angle indicating the direction of the user motion with respect to the absolute reference system.

If the inertia measurement device is permanently fixed to the individual and can not, with reference to the individual's reference system, move with respect to an angle known a priori, then the original problem is simplified because the alignment between said individual reference system and said device reference system does not vary in time and, being the magnitude of the misalignment known a priori, it is possible to solve the problem trivially using one of the known traditional methods.

In the patent application PCT WO2014/025429 a method is described for the steps count and for the estimation of the angle of the direction of the walk of an individual which provides that the inertia measuring device is fixed (to the belt, to the shoe or elsewhere) and that the relative orientation between the reference systems of the individual and the device does not change over time. However, this method assumes as unknown the initial orientation difference between said device reference system and said individual reference system. The method uses an estimate of the pitch and roll angles to calculate the projection onto the horizontal plane $X_aY_a$ of the acceleration vector as measured by the accelerometer, purified in advance by the gravitational component. Then it proceeds to use the projected $Z_a$ component of said acceleration vector to detect the minimum points which are used to identify the instants of time that identify a step of the individual, starting from the assumption that each step is contained between two consecutive minimums as identified by said projected $Z_a$ component. Within each step so detected, with reference to the direction of motion of the walk, the method proceeds instead to calculate the angle D (angle that the axis $X_d$ of said device reference system forms with the direction $X_i$ of motion of said individual, similar to angle θ as shown in FIG. 4), obtained by calculating:

$$D = \tan^{-1}\left(\frac{d_y}{d_x}\right) \quad \text{EQ. 1}$$

wherein $d_y$ and $d_x$ represent the components of the displacement of the individual, calculated from the XY components of said acceleration projected on the horizontal plane:

$$d_x = \iint a_x$$

$$d_y = \iint a_y \quad \text{EQ. 2}$$

Another traditional method for determining the angle θ of the direction of motion was described by Nesma Mohssen et al. in "*It's the human that matters: accurate user orientation estimation for mobile computing applications*", Acts of MOBIQUITOUS published in 2014, 11th International Conference on Mobile and Ubiquitous Systems: Computing, Networking and Services, p. 70-79, ISBN: 978-1-63190-039-6. This traditional method uses the technique of PCA (Principal Component Analysis) to determine the direction of the walk but not its direction. This traditional method proceeds to transform, by using the pitch and roll angles, the acceleration vector measured by the accelerometer of the inertia measurement device, purified of the gravitational component, bringing it back to the horizontal plane. Subsequently, it applies PCA to the X and Y components of the linear acceleration vector projected on the horizontal plane, assuming that the direction of the individual's motion corresponds to that component of the linear acceleration as transformed through the PCA that has maximum variance.

Both described traditional methods have limitations.

The first conventional method described in WO2014/025429, in order to work, assumes that the inertia measuring device does not change orientation as the user is walking (it is rigidly fixed to the user). Moreover, determining the angle of the direction of motion D occurs only and exclusively every time the end of a step is detected. It is also noted that the operation of such traditional method calculates a quite good estimation of the length but leaves some ambiguity in determining the direction of the walk direction vector.

Unlike the method described by WO2014/025429, the second conventional method described by Mohssen et al. does not put constraints on how the inertia measuring device must be fixed to the individual, i.e. it allows relative changes between the reference systems of the device and that of the individual. It does not even put the constraint relating to the possibility of being able to determine the individual's direction only upon the occurrence of the recognition of a step. However, even this traditional method does not allow to determine, in an appropriate way, the direction of the vector of the direction of motion because the PCA allows to only determine the direction of maximum variance but not precisely the direction, causing an ambiguity in the choice of the π-radians amplitude circular sector within which this vector lies. Trivially, said method, to resolve the ambiguity, uses a heuristic based on the value of the angle of yaw of the inertia measuring device, what does not guarantee any level of reliability. Furthermore, this conventional method needs to collect a series of accelerometer measurements in a time window before applying the PCA and accordingly be able to determine the direction of motion. Finally, this method turns out to be computationally expensive because of the need of having to perform the calculation of the PCA at regular time intervals, equal to the window size, and of a substantial amount of acceleration values.

The method described in the patent application US2012136573A1 solves the problem of pedestrian dead reckoning (PDR). As part of the estimation of the direction of motion of an individual equipped with an inertia measurement device, it provides to use the measurements of the only accelerometer sensor, assuming as known the angle to the north (yaw).

The technique involves identifying the inertial horizontal plane (plane perpendicular to the gravity vector) by estimating the direction of maximum variance in a accelerometer data window, assuming that this direction actually coincides with the gravity vector. To estimate this, the method requires an exhaustive search on the pair of roll-pitch angles with an ensuing increase of both spatial and computational cost.

Note also that, although the assumption has been experimentally verified in different contexts, there is no proof for the whole set of possible scenarios, and scenarios can occur in which the gravity vector is not aligned with the direction of maximum variance (for example in the case in which a person walks crawling the feet).

Assuming that the previous phase has correctly identified the vertical axis, the method also provides for further exhaustive research on the inertial horizontal plane described above, by determining new directions of maximum and minimum variance in the horizontal plane which are assumed to be coincident respectively with the direction of motion (forward direction) and the direction perpendicular to the motion (lateral direction).

Once the estimation of the axis of motion is known, the technique provides for the disambiguation of the direction by analyzing the correlation between the horizontal acceleration reprojected on the plane containing the presumed axis of motion and the measured acceleration, along the estimated vertical axis, shifted in phase by 90°. If the relationship of these signals is within ranges taken as valid in the description, the disambiguation of the direction is carried out, otherwise the algorithm is not able to update the estimate of the axis (passing through the vector) and direction of motion and consequently does not produce any result.

SUMMARY OF THE INVENTION

It is an object of the present invention to solve the problems and overcome the drawbacks of the existing traditional methods.

More specifically, an object of the present invention is to determine the axis and direction of the vector relevant to the individual's walk, or to determine the unknown angle θ shown in FIG. 4.

Within this aim, an object of the present invention is that of not requiring any assumption on relative orientation between the individual and the inertia measuring device that wore or carried by the individual.

Another object of the present invention is to ensure the precise and analytical estimate of both the information characterizing the vector representative of the individual's motion and determine both the axis and the direction.

Another object of the present invention is to not constrain said estimate to specific conditions such as the determination of the individual's step, or the occurrence of other external situations.

Another object of the present invention is to perform said real-time estimate, using few computational resources.

These, as well as other objects which will better become more clear hereinafter, are achieved by a method for the estimation of the axis direction and direction of motion of an individual or of an object according to claim 1 attached hereto.

Detailed features of the method for estimating the direction axis and direction of the walk of an individual according to the invention are disclosed in the dependent claims.

DETAILED DESCRIPTION OF EMBODIMENTS OF THE INVENTION

Further characteristics and advantages of the invention will become more clear from the description of preferred, but not exclusive embodiments of a method for estimating the direction axis and direction of the walk of an individual according to the invention, illustrated only by way of illustration but not by way of limitation in the accompanying drawings, in which:

FIG. 1 shows the reference systems used to facilitate the explanation of the method. FIGS. 1a and 1b show an absolute reference system known as NED (North, East, Down). FIG. 1c shows the reference system fixed to the individual wherein the X axis is aligned with the direction of the walk. FIG. 1d shows the reference frame of the device designed to measure the inertia.

FIG. 2 identifies in detail the yaw angle $\psi$ which substantially expresses the orientation of the device about the gravitational axis (coincident with the Z-axis), evaluated with respect to the $X_a$ axis of the absolute reference system, which by definition is aligned to North.

FIG. 3 shows a total of the three reference systems of the previous figures. In FIG. 3a, the reference system of the individual who carries a device for measuring the inertia and the reference system of the same device are shown; in this case the device is a smartphone. FIG. 3b shows the absolute reference system.

extractable from a 360 degree angle, the straight angle having been divided into n=6 sectors of equal amplitude equal to $$\frac{\pi}{6}$$

radians.

Figure 6:
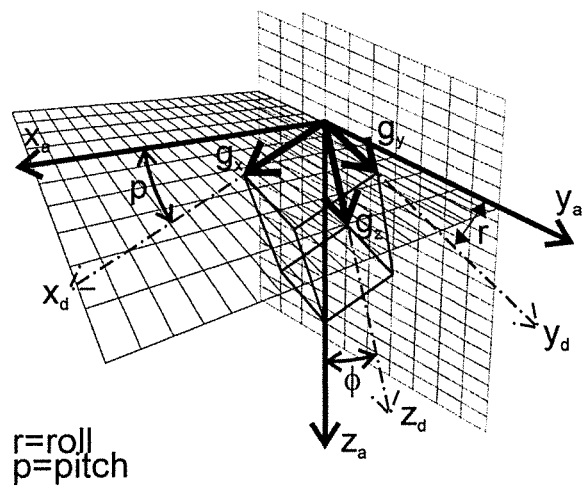

FIG. 6 shows the two absolute and inertia measuring device reference systems with evidence of the representation of the gravity vector $g=(g_x, g_y, g_z)$ as measured by an accelerometer located inside said device and with the indication of the two angles of roll (r) and pitch (p) representative of the inclination with respect to the axes X and Y.

Figure 5:
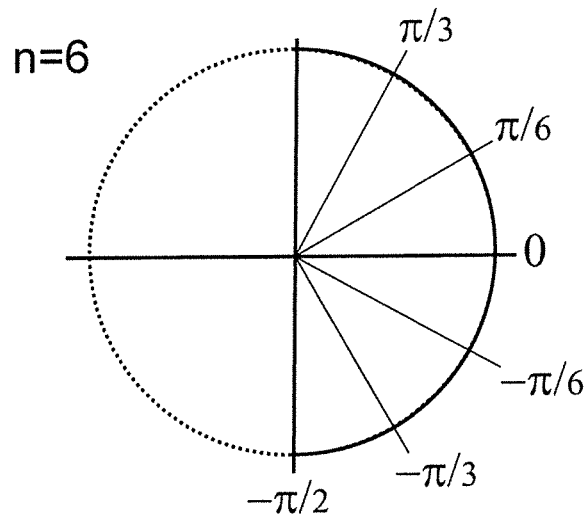
FIG. 5 shows one of the 180 degree angles $$[-\frac{\pi}{2}; \frac{\pi}{2}]$$
Figure 7:
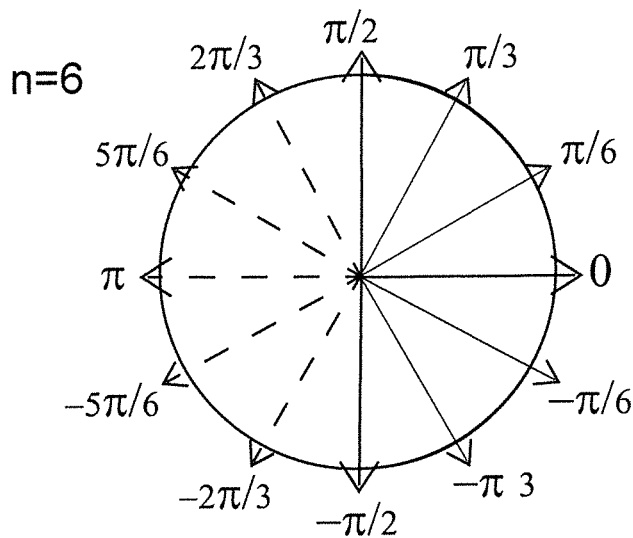

FIG. 7 shows the 180 degree angle already shown in FIG. 5 with evidence and indication of the directions.

Figure 8:
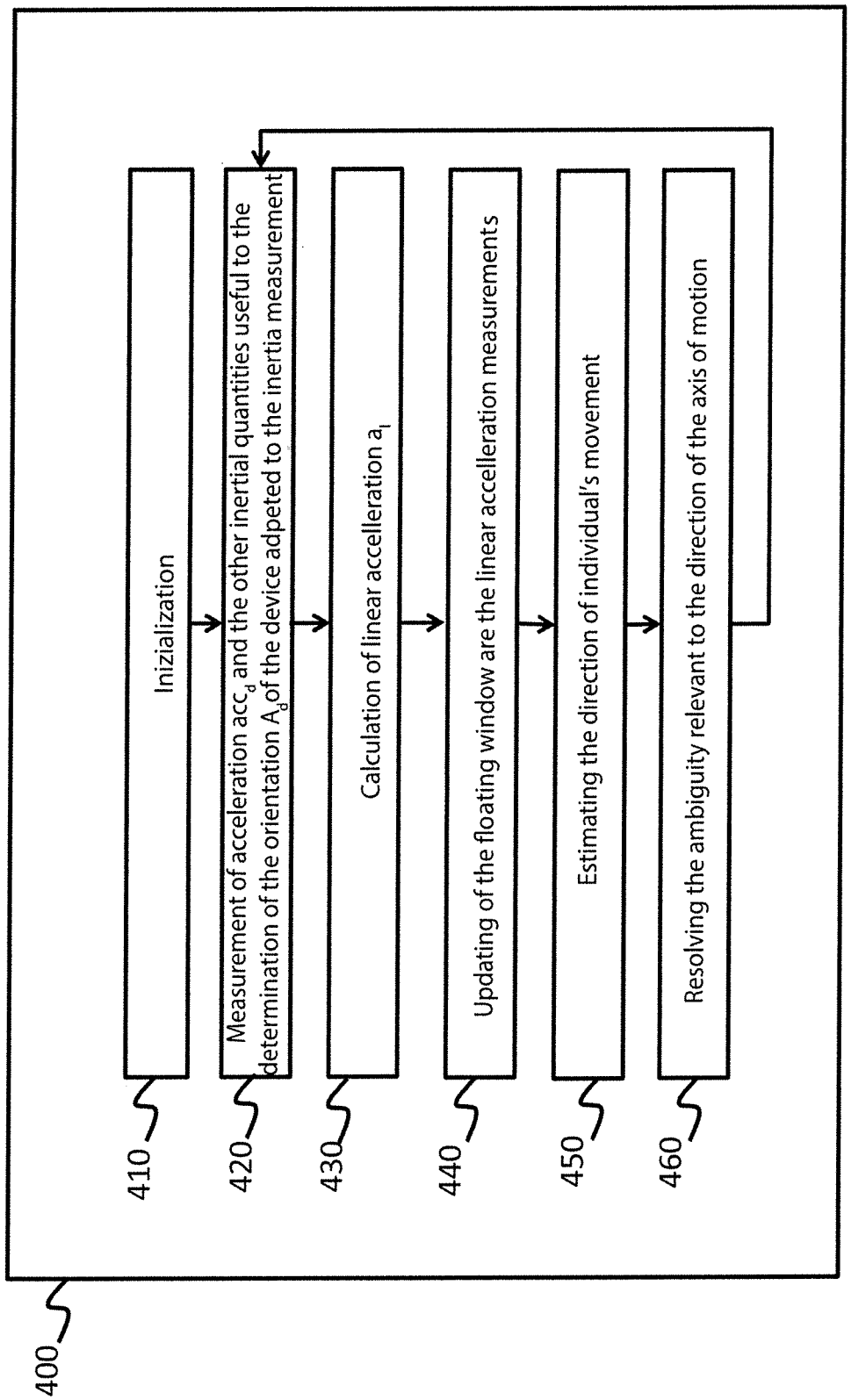

FIG. 8 shows a flow chart of the invention method for estimating the direction of the walk.

Figure 9:
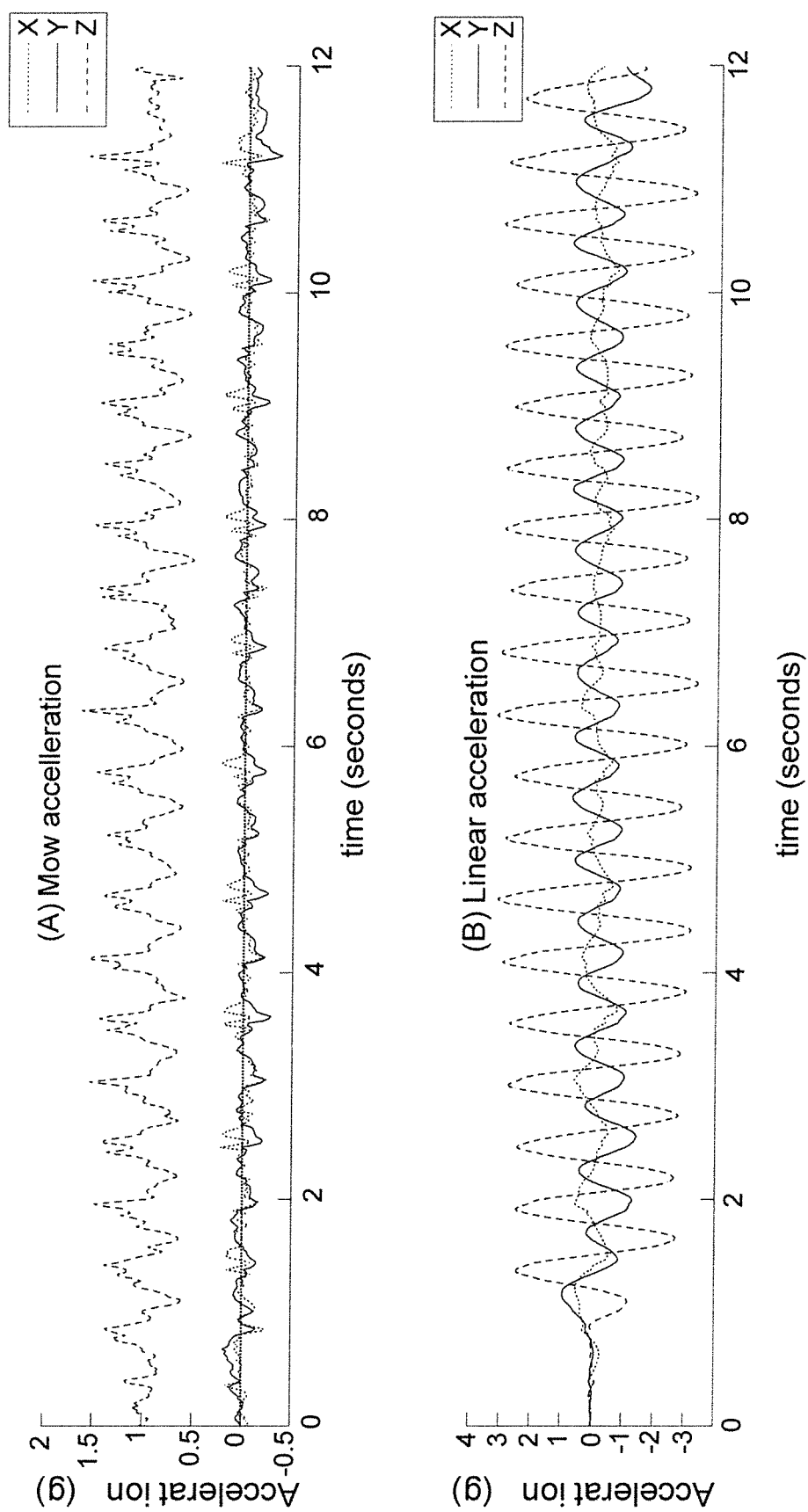

FIG. 9a shows a diagram of the rough accelerations measured on the three axes of an accelerometer during a walk, as expressed in the reference system of the orientation measuring device. FIG. 9b shows the linear accelerations, expressed in the absolute reference system, as obtained starting from the raw acceleration and applying a low pass filter, rotating the orientation and eliminating the gravitational component.

Figure 10:
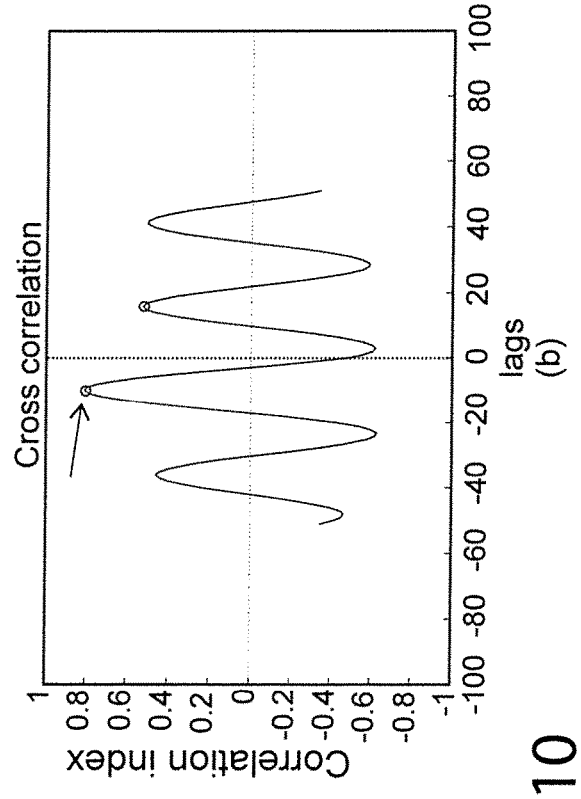
Figure 10:
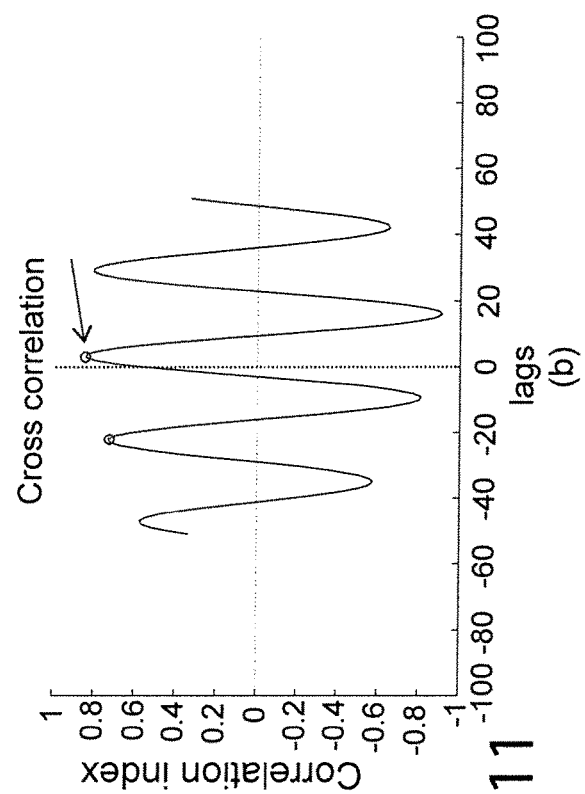
Figure 11:
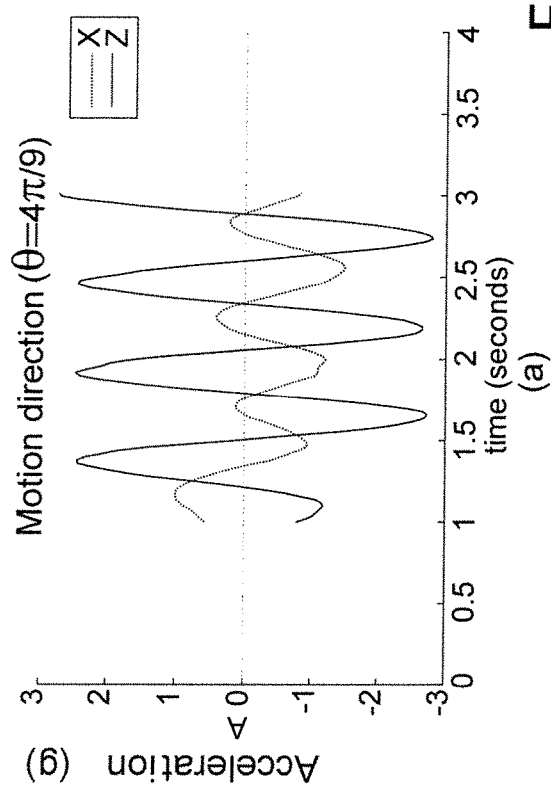
Figure 11:
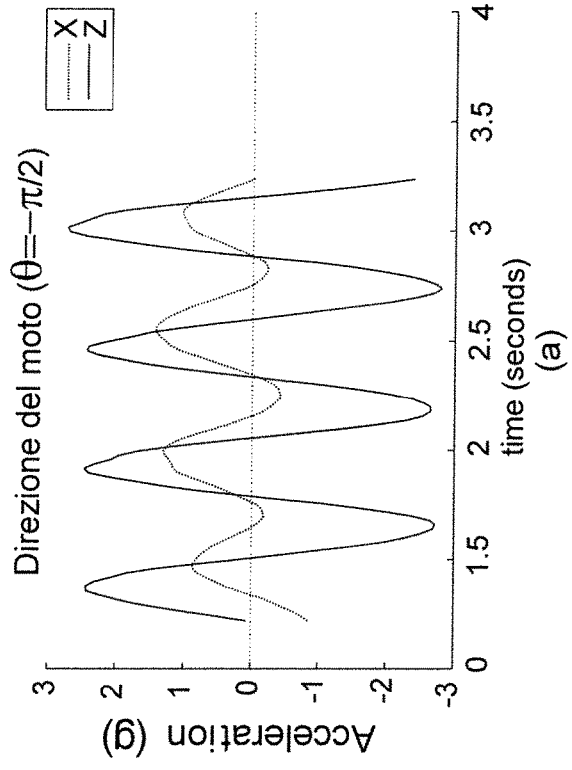
Figure 12:
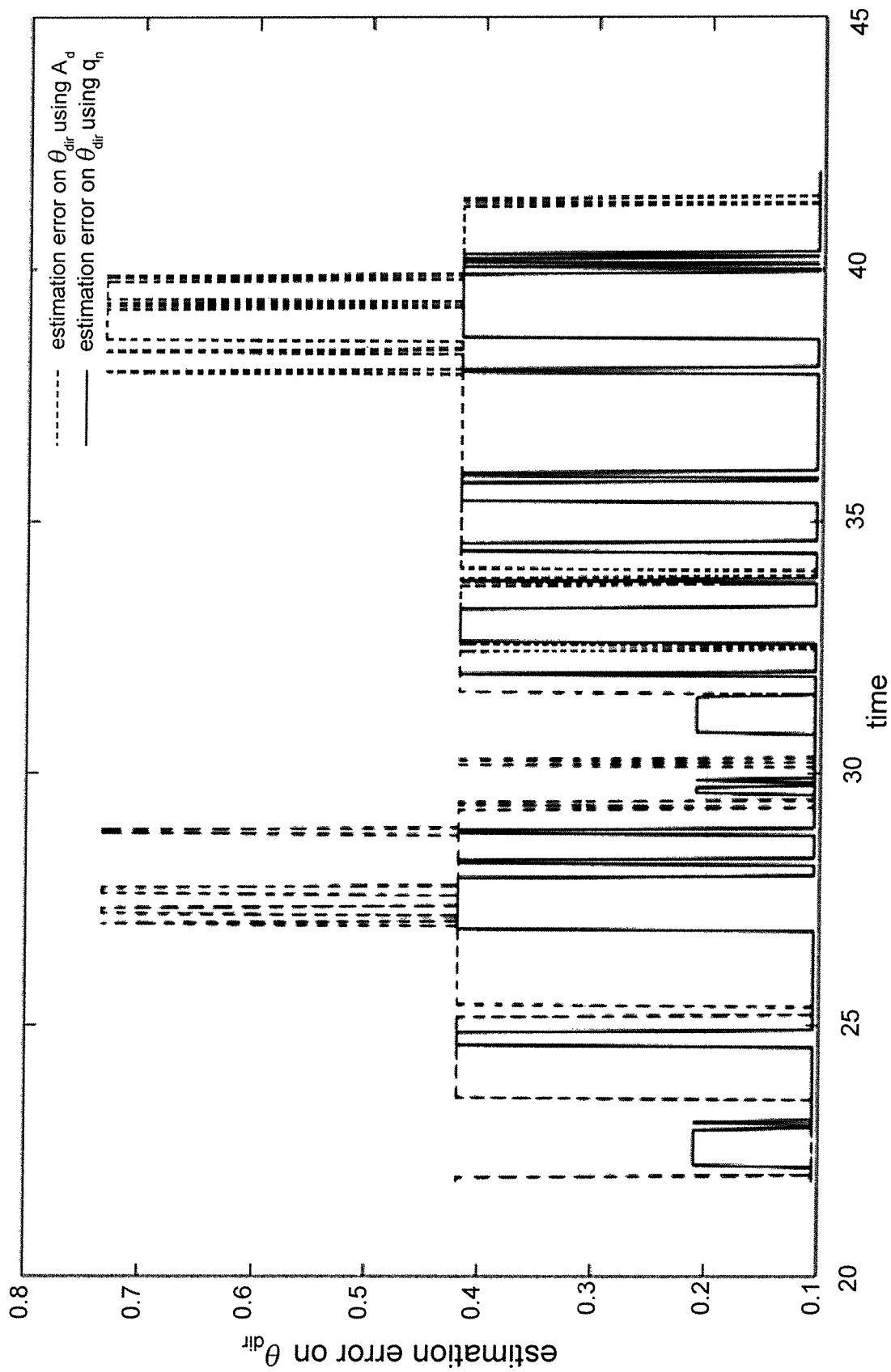

FIGS. 10a and 11a show a detail of the signals contained within a time window during the execution of the method. FIGS. 10b and 11b show the cross-correlation graph relating to said signals; and FIG. 12 shows a snapshot of the error between the real axis of motion and the estimation ones obtained by projecting on the horizontal plane using the attitude $A_d$ or the quaternion q (hereafter described), respectively.

The present invention describes an analytical method capable of real-time estimating the axis and direction of the walk of an individual. In particular, this is done by determining the angle $\theta \in [0; 2\pi)$ shown in FIG. 4. The use of said angle, together with an estimation of the attitude of the inertia measurement device, obtainable by using any of the conventional methods such as that described by Magdwick et al., allows to reconstruct in an univocal and absolute way the axis and direction of motion of the individual's movement on a horizontal plane regardless of how the individual carries the inertia measuring device, i.e. irrespective of the relative orientation between the individual's reference system and the device reference system.

Definitions

It is here defined as "attitude" of a device a minimal set of variables that allow to reconstruct, univocally, the orientation of the reference system integral to the device with respect to a fixed reference system.

Such minimal set can be constituted, according to the known art, in an equivalent manner by: 1) a set of three angles (for example roll, pitch, yaw), 2) a 3×3 rotation matrix, 3) a quaternion (see eg. (F. L. Markley, J. L. Crassidis (2014), Fundamentals of Spacecraft Attitude Determination and Control. Springer).

Using the measurement of the magnetic vector $m=(m_x, m_y, m_z)$ with respect to the North (in the $X_a Y_a Z_a$ NED system illustrated in FIG. 3b) and the measurements of roll and pitch angles, it is possible to calculate the angle of yaw $\psi$, using known methods (e.g. Eq. 3 in the following).

It is here defined as "linear acceleration" of a material point a three-dimensional vector acting on the plane $X_a Y_a$ of the inertial reference system (NED) that represents the component of the individual's motion acceleration perpendicular to gravity.

Figure 3:
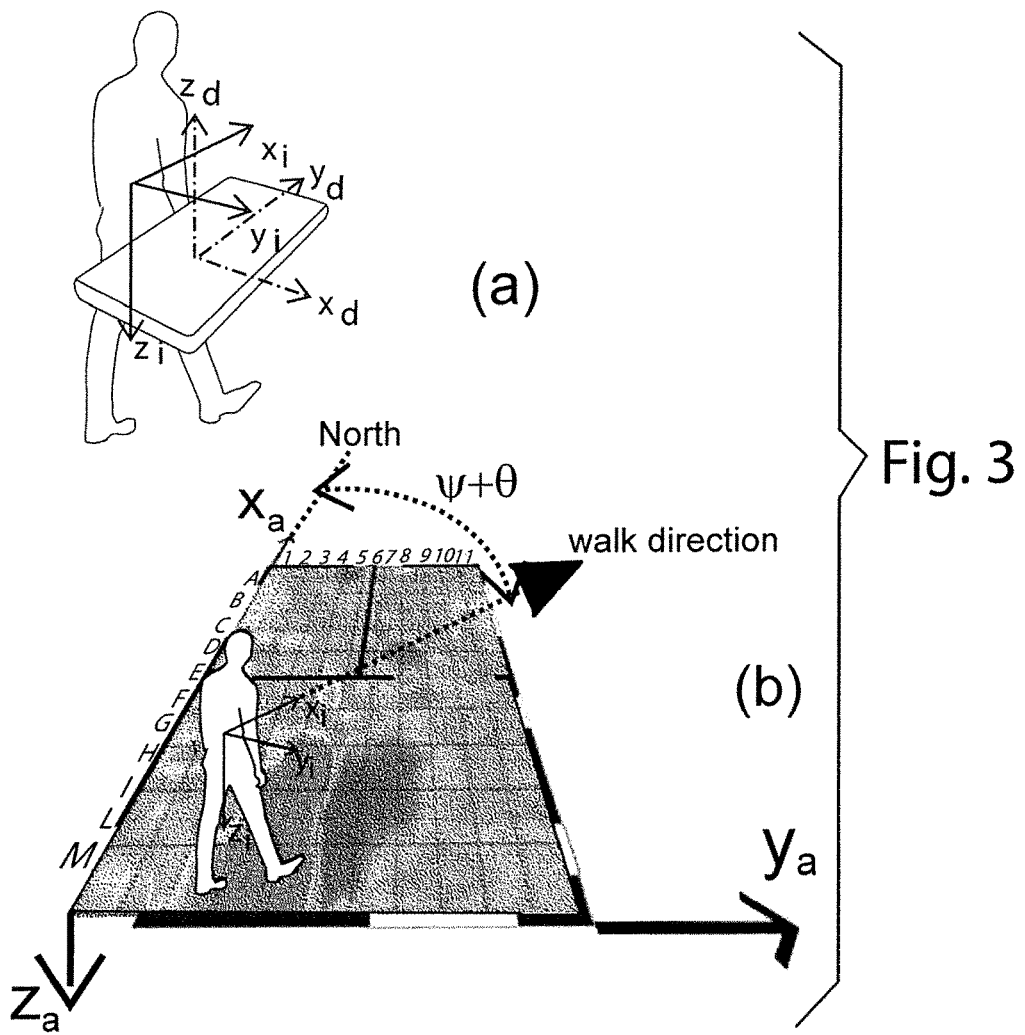

In the following, as absolute reference system, reference will always be made to the NED system (FIG. 3b).

Method for the Calculation of the Travel Direction

Discretization of 180 Degree Angle

The present invention determines the desired angle $\theta$ by means of two basic steps:
- a first computational step determines an estimate of the direction of motion, which provides an angle $\theta_{dir}$ representative of the angle between the reference axis of the inertial system of the device and the axis along which the individual motion takes place. This angle between the axis of motion and the reference axis may coincide or be opposite to the angle of the axis of motion, depending on the direction of motion.
- A second computational step, in which such ambiguity on direction is dissolved and, starting from $\theta_{dir}$, the sought angle $\theta$ is obtained.

With reference also to FIG. 8, in the first computational step, one chooses:
a desired estimation accuracy Δθ; and
a generic 180 degree angle (for example $$[-\frac{\pi}{2};\frac{\pi}{2}]$$

extracted from the 360 degree angle. It is noted here that from a 360 degree angle endless 180 degree angles can be extracted, depending on the origin of the angle and the direction of the angle. The arbitrariness of the choice does not diminish the generality of what it is said below.

Subsequently, the 180 degree angle is discretized according to the desired accuracy, i.e. subdivided into equal parts, each having amplitude Δθ. The discretization is performed to reduce the computational cost and, with increasing desired accuracy, i.e. with decreasing Δθ, the computational load associated with calculation of the motion direction angle increases.

In a preferred embodiment, the first step 410 of initialization provides to divide the 180 degree angle $$[-\frac{\pi}{2};\frac{\pi}{2})$$

into n sectors of equal size. The chosen number of sectors n determines the level of accuracy obtained in the final estimate of the direction of motion (specifically the chosen accuracy will be of $$\Delta\theta = \frac{\pi}{n}).$$

For example, if one chooses n=6 (FIG. 5), one can extract from the 180 degree angle $$[-\frac{\pi}{2};\frac{\pi}{2})$$

n allowable values for the angle $\theta_{dir}$, which correspond to discrete angles set $$AS = \{-\frac{\pi}{2}; -\frac{\pi}{3}; -\frac{\pi}{6}; 0; \frac{\pi}{6}; \frac{\pi}{3}\}.$$

It is sufficient to include only one of the endpoints of the 180 degree angle as the other extreme is on the same axis apart from the sign that precisely indicates the direction. The estimation of the direction of motion as performed with n=6, provides for selecting the estimate of the angle associated to said axis among those included in said discrete set of angles apart from the ambiguity that is resolved at a later step of the method according to the invention. This estimate is therefore affected by an uncertainty in the determination of the said direction equal to $$\frac{\pi}{n} = \frac{\pi}{6} = 30°,$$

i.e. it is not allowed to estimate different directions if these directions are smaller changes $$\frac{\pi}{6}$$

radians.

Basic Steps of the Estimation Algorithm

With particular reference to the above figures, the numeral 400 globally indicates a method for estimating the direction axis and direction of the walk of an individual who carries a device adapted to measure of inertia and that, according to the present invention, has a particular peculiarity in that it comprises:

A first step 410 of initialization, during which the representative interval relative to one of the straight angles, for example $$[-\frac{\pi}{2};\frac{\pi}{2}),$$

as extractable by a round angle, is divided into n discrete angles, with n positive integer, which lay down the level of accuracy $$\Delta\theta = \frac{\pi}{n}$$

by which the final estimate of the angle of the direction of motion, according to this method, is determined.

A second step 420 of measurement of the acceleration and the other inertial quantities useful to the attitude determination of said carried device adapted to measure the inertia.

A third step 430 of calculation of the linear acceleration to which said transported device is subjected during the motion of said individual.

A fourth step 440 of updating a floating data window containing said linear acceleration measurements rotated through said discrete angles, therefore calculating n rotations.

A fifth step 450 of estimation of the discrete angle of the individual's axis of motion $\theta_{dir}$.

A sixth step 460 of ambiguity resolution of the direction of said given axis as determined in said fifth estimation step so as to obtain the sought value θ starting from $\theta_{dir}$.

Measurements Made by the Measuring Device

The measuring device, or any device equipped with inertial sensors, such as accelerometer, magnetometer (sensor adapted to measuring the attitude of said device with respect to the North) and, possibly, gyroscope, for example a smartphone, is used in the present invention for accumulating inertial data in a chosen time window.

Preferably, said inertial sensors are triaxial sensors.

The method according to the invention, in addition to the discretization of a straight angle extracted from a round angle, above, also makes a time discretization in time windows of predetermined length, managed by a floating window mechanism and in which the values acquired from the above sensors are stored and one calculates the angle θ representing the direction axis and direction of motion. In this way, one has a real-time estimate of that angle while the individual moves.

Preferably, in said step of initialization, the number of measurements is fixed or the number of seconds k relative to the measurements from said inertia measuring device that are accumulated within a time window AQ and used to provide an estimate of said angle θ representing the direction of motion of said individual.

In each time window AQ, one acquires 420 the vector acceleration $acc_d$ acting on the device and expressed in the reference system fixed with the same device, and other measurable quantities from said inertial sensors of 1s the device adapted to measure the inertia.

Preferably, said second step 420 may comprise the application of digital filtering techniques (low pass, band pass, etc.) to the measured acceleration signals so as to reduce the effect of any noise on the measurement of the process of θ angle estimation.

Computation of the Device Attitude

To calculate the attitude, any of equivalents representations based on rotation matrices, Euler angles or unitary quaternions may be used, arriving at the same end result. For example, in the case in which the device is equipped only with accelerometer and magnetometer, using the acceleration vector acquired as above and a conventional method such as that described by Sergiusz Łuczak et al. in "*Sensing Tilt With MEMS Accelerometers*" IEEE Sensors Journal, Volume 6, Issue 6, Pages 1669-1675, December 2006, ISSN 1530-437X, one can derive the two angles (r, p) of roll and pitch shown in FIG. 6.

Figure 1:
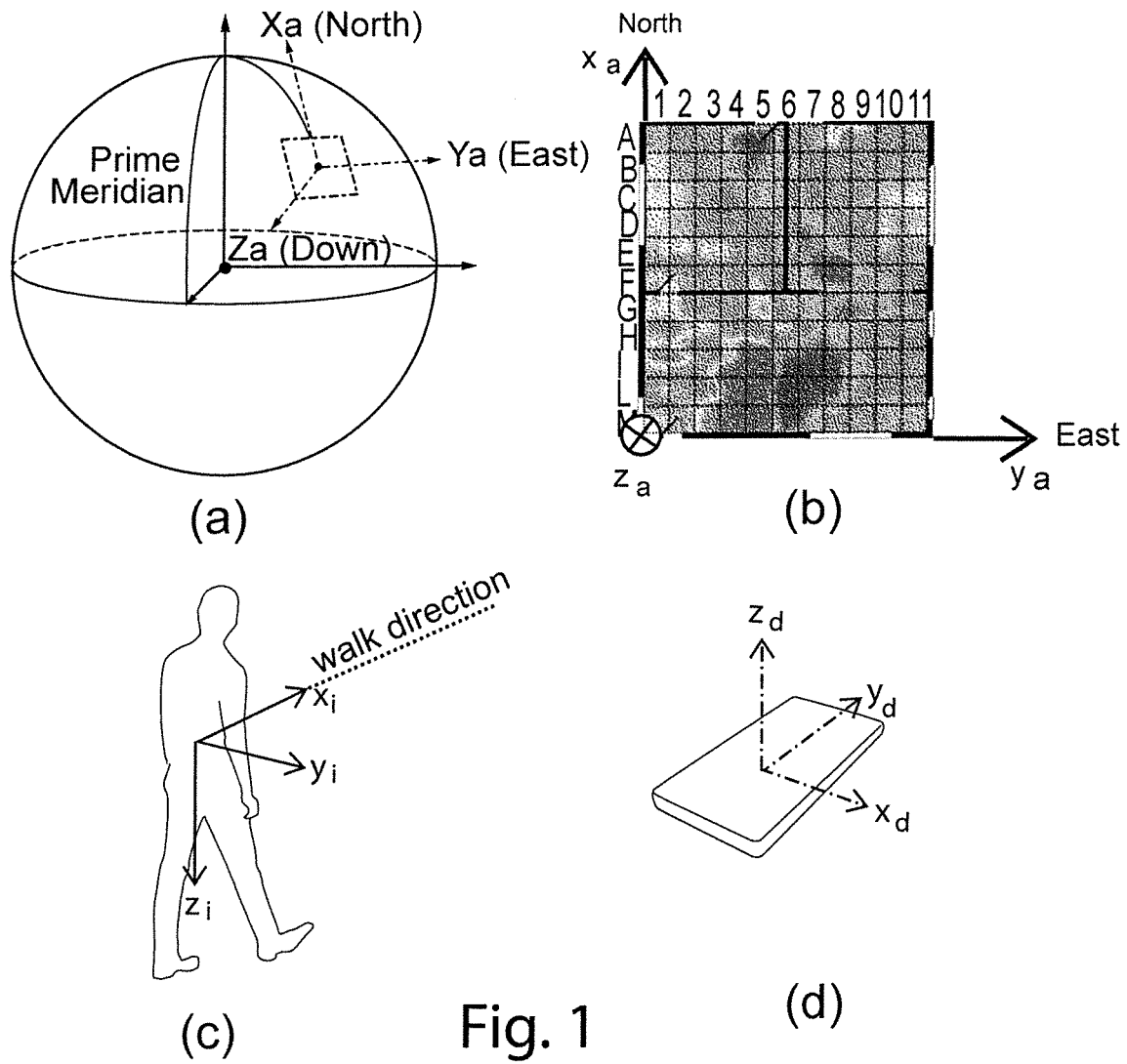
Figure 2:
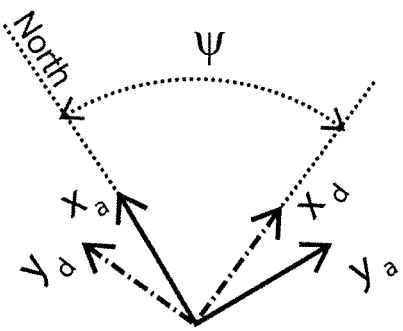

Using the measurement of the geomagnetic vector $m=(m_x, m_y, m_z)$ with respect to the North (NED absolute frame of reference) and the roll and pitch angles, it is possible to calculate the yaw angle ψ shown in FIG. 2, by the following relation given in the just mentioned publication of Sergiusz Łuczak et al.:

$$\tan(\psi) = \frac{m_x\cos(r) + m_y\sin(r)\sin(p) + m_z\sin(r)\cos(p)}{m_z\sin(p) - m_y\cos(p)} \quad \text{EQ. 3}$$

The roll and pitch angles can be calculated through traditional methods that rely only on the accelerometric measurements or also on the measurements obtained by a triaxial gyroscope, which may be optionally provided in the system of the invention. In the latter case, all available information from the accelerometer, magnetometric (for yaw) and gyroscopic data, as well as other traditional methods, such as the method described by said SOH Madgwick et al., are used.

Thanks to these traditional methods, according to the invention, the attitude $A_d$ of said device (representable as shown in F. L. Markley, J. L. Crassidis (2014). Fundamentals of Spacecraft Attitude Determination and Control. Springer) with respect to said absolute reference system equivalently expressed by the Euler angles (for instance roll, pitch, yaw) or by a rotation matrix $R \in \mathbb{R}^{3\times 3}$ or by a unitary quaternion $q_d = \{q_0, q_1, q_2, q_3\}$ is obtained.

Linear Acceleration Calculation

In said preferred embodiment, said third step 430 of linear acceleration calculation includes:

A first step, which uses the attitude information $A_d$ to rotate (see for example F. L. Markley, J. L. Crassidis (2014). Fundamentals of Spacecraft Attitude Determination and Control. Springer) the three-dimensional vector $acc_d$ acceleration measured in the horizontal plane $X_a Y_a$ of said absolute reference system, obtaining a new vector of acceleration $acc_h$.

A second step of elimination of the gravitational component from the vector $acc_h$, to obtain the linear acceleration $acc_l$:

$$acc_l = \begin{bmatrix} acc_l x \\ acc_l y \\ acc_l z \end{bmatrix} = acc_h - g \quad \text{EQ. 4}$$

$$g = [0, 0, g_{Za}]$$

The value $acc_l$ represents the linear acceleration measurement obtained from the original acceleration as measured by said acceleration sensor of the device, rotated onto the horizontal plane of said absolute reference system to which the gravitational component has been subtracted. The gravitational component measured in the absolute reference system $g=[0,0,g_{Za}]$, if expressed in SI units, is equal to about $g_{Za}=9.81$ m/s$_2$.

Preferably, in said third step 430, said first step provides for the use of roll and pitch angles for rotating the acceleration vector $acc_d$ onto the horizontal plane of said absolute reference system:

$$acc_h = \begin{bmatrix} acc_h x \\ acc_h y \\ acc_h z \end{bmatrix} = \quad \text{EQ 5}$$

$$= \begin{bmatrix} \cos(p) & 0 & \sin(p) \\ 0 & 1 & 0 \\ -\sin(p) & 0 & \cos(p) \end{bmatrix} \begin{bmatrix} 1 & 0 & 0 \\ 0 & \cos(r) & -\sin(r) \\ 0 & \sin(r) & \cos(r) \end{bmatrix} acc_d$$

in which $acc_h x$, $acc_h x$, $acc_h x$ are the components of $acc_h$ in the reference system $X_a Y_a Z_a$.

In the following, to avoid ambiguity problems related to the use of the Euler angles, (ambiguity known as "gimbal-lock"), in said third step 430, said first step provides for the use the said formalism of quaternions, thus defining quaternion $q_d$ that defines the attitude of said device.

In this formalism, one proceeds as follows:

Calculation of the axis of rotation vector axis obtained from the cross product of the gravitational vector $g=[0,0,g_{Za}]$ expressed in said absolute reference system and a new gravitational vector $g_s$ obtained by transforming, by the application of a quaternion $q_d$ that defines the structure $A_d$, the gravitational vector g from the device reference system to the absolute reference system:

$$g_s = q_d \cdot g \cdot q_d^{-1}$$

$$\text{axis} = g \times g_s$$

The term $q_d^{-1}$ is the conjugate of the quaternion $q_d$, the operator represents the product between quaternions wherein the three-dimensional vector to be rotated has been increased by a dimension by inserting a 0 component.

calculation of angle ϕ between the two vectors g and $g_s$ (FIG. 6), which integrates the information of roll and pitch, calculable for example, without limitation, as follows:

$$\phi = -a\tan 2(\|g \times g_s\|, \langle g, g_s \rangle)$$

wherein the operator $\|\cdot\|$ is the norm of a vector, the operator $\langle \cdot, \cdot \rangle$ is the scalar product operation between two vectors and the function a tan 2(y,x) represents the function $$\text{atan}\left(\frac{y}{x}\right)$$

purged of the ambiguity of 180 degrees thanks to the analysis of the signs of the numerator y and denominator x, i.e.:

$$\text{atan2}(y, x) = \begin{cases} \text{atan}\left(\frac{y}{x}\right) & \text{if } x > 0 \\ \text{atan}\left(\frac{y}{x}\right) + \pi & \text{if } x < 0 \text{ and } y \geq 0 \\ \text{atan}\left(\frac{y}{x}\right) - \pi & \text{if } x < 0 \text{ and } y < 0 \\ \frac{\pi}{2} & \text{if } x = 0 \text{ and } y > 0 \\ -\frac{\pi}{2} & \text{if } x = 0 \text{ and } y < 0 \\ \text{undefined} & \text{if } x = 0 \text{ and } y = 0 \end{cases}$$

Construction of a new quaternion $q_n$ from the values of axis and $\phi$ calculated in the previous steps, according to known mathematical methods (J. B. Kuipers, Quaternions & Rotation Sequences: A Primer with Applications to Orbits, Aerospace and Virtual Reality, Princeton University Press, 1999).

Rotation of the original vector $acc_d$ onto the horizontal plane $X_a Y_a$ of said absolute reference system by said new quaternion $q_n$:

$$acc_h = q_n^{-1} \cdot acc_d \cdot q_n \qquad \text{EQ. 6}$$

Update of the Floating Window

In said preferred embodiment, said fourth step 440 to update the floating window includes a matrix representation of the floating window, in 1s which each column of the matrix represents a set of linear acceleration values rotated according to the set angles AS, To a time instant set, to be stored within the floating window itself. In particular, for the floating window management simplicity, the data is stored for time instants in the flow increasing from left to right the columns of the matrix AQ adopted to store the data of the floating window. It provides for the construction and update of floating window:

A first calculation operation, for each angle $\theta_j \in AS$, with $j=1, \ldots, n$, therefore belonging to the n angles of said set AS of discrete angles as determined in said first initialization step, of the following function of the vector $acc_i$:

$$acc_{\theta_j} = acc_i x \cdot \cos(\theta_j) + acc_i y \cdot \sin(\theta_j) \qquad \text{EQ. 7}$$

A second appending operation of a (new) column c containing at least said values $acc_{\theta_j}, j=1, \ldots, n$, and the component $acc_i z$ of said vector $acc_i$ within the time window AQ, initialized as AQ=[ ](empty array).

$$c = [acc_{\theta_1}, \ldots, acc_{\theta_n}, acc_i z]^T$$

$$AQ = [AQ, c] \qquad \text{EQ. 8}$$

A third calculation operation, in which the variances $\{\sigma^2(acc_{\theta_1}), \ldots, \sigma^2(acc_{\theta_n}), \sigma^2(acc_i z)\}$ of the quantities stored in the rows of said time window AQ are calculated.

It is here specified that the appending of a column takes place regardless of whether the relative measured accelerations correspond to a specific pattern such as the recognition of a walking step.

Preferably, in said second appending operation, there is provided a control operation of the length of the time window AQ that includes eliminating the old column from the time window if the length (number of column) of said window exceeds a predetermined value, understood as the number of samples or as a number of seconds (then conveniently as a function of the columns number, because the number of columns is related to the sampling frequency of the accelerometer).

Calculation of Angle $\theta_{dir}$ Relative to the Axis of the Direction of Motion Advantageously, to optimize computational resources, said third operation of calculation of the variances of said fourth step 440 may include the use of traditional methods for on-the-fly and incremental calculation of the variance relevant to each angle $\theta_j$ and to the signal relating to component $acc_i z$. Some of these traditional methods are described by Chan, Tony F.; Golub, Gene H.; LeVeque, Randall J. (1983). "*Algorithms for Computing the Sample Variance: Analysis and Recommendations*", The American Statistician 37, pages 242-247 and Ling, Robert F. (1974). "*Comparison of Several Algorithms for Computing Sample Means and Variances*". Journal of the American Statistical Association, Vol. 69, No. 348, pages 859-866.

In said preferred embodiment, one applies specifically to the present invention the physical principle of maximum variability of the linear measurement of the acceleration along the various possible directions. To do this, in said fifth step 450 of estimate of the angle $\theta_{dir}$, it is selected as an angle $\theta_{dir}$ associated with the direction of the individual's motion the angle value $\theta_j \in AS$ which has the maximum variance between said selected variances calculated in said third calculation operation of said fourth step of updating 440:

$$\theta_{dir} = \arg\max_{\theta_j \in AS} \sigma^2(acc_{\theta_j}).$$

Said fifth step of estimating the angle associated with the axis of the direction of motion 450 allows to obtain a direction $\theta_{dir}$ selected from said set AS represented in FIG. 5; however, it does not yet allow to establish the travel direction along said direction axis. For example, if the selected direction axis is the one corresponding to the angle null, then it is not yet possible to determine which is the travel direction, which, with reference to FIG. 7, could be from the circumference center toward the indication of the arrow corresponding to the angle zero or from center of the circumference towards the indication of the corresponding arrow on the angle $\pi$. In a similar way, this holds for the other angles belonging to said set AS.

Calculation of Angle $\theta$ (without Ambiguity on the Direction) Relevant to the Direction of Motion In said preferred embodiment, said sixth step (460) of ambiguity resolution of the direction is characterized by comprising:

A first calculation operation of an index of "cross-correlation" (or "correlation with lag" that provides an correlation index as a function of the lag, which is defined as the deviation of a signal with respect to another) between two sequences extracted from the said time window AQ and respectively composed by the linear acceleration z component $acc_i z$ taken as the reference signal and the sequence of values $acc_{\theta_{dir}}$, as obtained by extracting the row associated with $\theta_{dir}$ from the reference time window AQ identified in the previous step; with respect to this row, lags are calculated;

A second search operation that includes performing two searches starting from zero lag and respectively moving to the left by identifying the maximum correlation value of the left and moving to the right by identifying the maximum correlation value of the right.

A third verification operation in which it is controlled in what position relative to zero lag the maximum of the left and right of the maximum are placed as found in said second search operation, and behaving as follows:

If the maximum correlation value closest to zero lag is found on the left, then the direction $\theta_{dir}$ chosen in the previous step correctly identifies also the direction, which corresponds to the value $\theta_{dir}$ and proceeding to confirm $\theta=\theta_{dir}$ as estimate of the angle representing the axis and direction of the individual's motion.

If the maximum correlation value closest to zero lag is found on the right, then the direction, related to $\theta_{dir}$, chosen in the previous step corresponds in the direction opposite to the direction of user's actual motion; in this case, one proceeds in estimating said direction by selecting as result the angle opposite to the angle $\theta_{dir}$ estimated in said fourth step of calculation of the discrete angles; it follows that $\theta=\theta_{dir}+\pi$.

Preferably, the cross-correlation index is calculated using the Pearson correlation coefficient.

Example of Determination of the Direction of Motion

Figure 4:
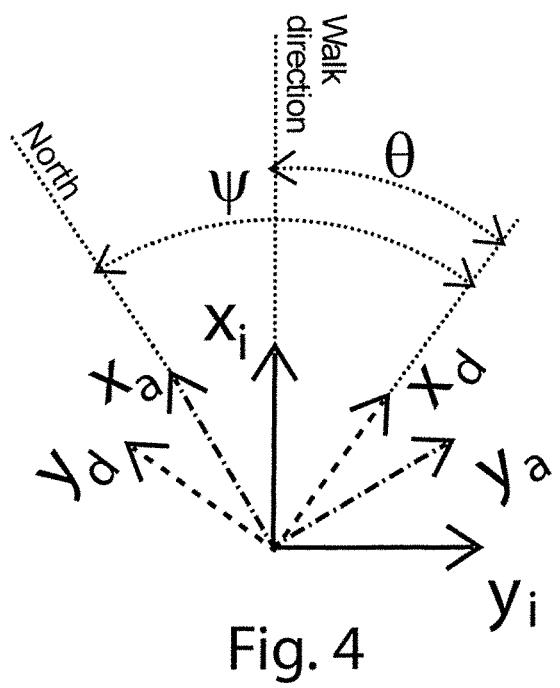
FIG. 4 shows a detail on the horizontal plane perpendicular to the Z axis of the three reference systems by identifying the angle of yaw $\psi$ and the angle of the direction of motion $\theta$ estimated by this method.

By way of non-exhaustive and non-limiting example, during the execution of an embodiment in accordance with the present method, the behavior of said fifth step of determining the direction is described when applied to a walk of an individual, who carries said device so that the angle $\theta$ to be estimated, represented in FIG. 4, is equal to +85° degrees or equal to +17π/36 radians. It is assumed that said initialization method of said embodiment example uses a value of n=18 by dividing accordingly the straight angle into 18 sectors of amplitude π/18 radians. It is also assumed that the size of said AQ time window is fixed to 2 seconds.

FIG. 9a shows a graph of the acceleration detected on the $X_a$, $Y_a$, $Z_a$ axes as measured by said inertia measuring device during said exemplary walk. FIG. 9b shows said linear accelerations after execution of said third step 430 of linear acceleration calculation, wherein in said previous steps a digital low pass filter has been applied to the original signal measured by said device. As also described in the traditional method of WO2014/025429, it is evident that, with reference to the $Z_a$ axis of said figures, it is immediate to associate with each minimum of acceleration signal along $Z_a$ the occurrence of an event related to the beginning or the end walking step of said individual.

FIG. 10a shows such acceleration values $acc_{\theta_{dir}}$, i.e. the linear acceleration along the direction defined by the angle $\theta_{dir}$, and $acc_i z$ contained in a time window $AQ_0$, during the execution of the method according to the invention, as observed immediately after the execution of said third operation of determining the direction of motion. Said figure compares the $acc_{\theta_{dir}}$ trend represented by the dotted line, which corresponds, in accordance with the present method, to the axis of the direction of motion defined by the angle $$\theta_{dir} = \frac{4\pi}{9},$$

with the linear acceleration measured along the $Z_a$ axis $acc_i z$. In accordance with the execution of the method according to the invention, FIG. 10b shows the cross-correlation index calculated on two acceleration signals, respectively along the direction of motion as given by angle $\theta_{dir}$ and along the Z axis of the reference system taken as absolute, highlighting with an arrow the point at which the maximum correlation is detected and with a vertical hatch the correspondence with the zero lag. In this case, said second verification operation of said fifth step of direction calculation confirms the estimate equal to $$\frac{4\pi}{9}$$

also for the direction of the axis of motion of said individual.

Similarly, FIG. 11a shows said linear acceleration values $acc_{\theta_{dir}}$, and $acc_i z$ contained in another specific exemplary time window $AQ_1$ also observed immediately after the execution of said third operation of determining the direction of motion. Even in this case, said FIG. compares the trend represented with dotted line of the linear acceleration relative to said discrete angle that has a maximum variance and which corresponds in this example, in accordance with the present method, to the angle associated with the direction axis of motion $$\theta_{dir} = -\frac{\pi}{2},$$

with the linear acceleration $acc_i z$ measured along the $Z_a$ axis. In accordance with the execution of the method according to the invention, FIG. 11b shows the cross-correlation index calculated on the two acceleration signals respectively along the axis defined by the angle $$\theta_{dir} = -\frac{\pi}{2}$$

and along the gravitational axis, highlighting with an arrow the point at which the maximum correlation is detected and with a vertical hatch the correspondence with the zero lag. In this case, said second verification operation of said fifth step of calculation of the direction detects a reversal of direction and produces as a result no longer the value of $$-\frac{\pi}{2},$$

but the opposite value equal to $$\frac{\pi}{2}.$$

Other embodiments of the method 400 may provide for direction verification steps 460 different but referable to the same concept, i.e. to controlling how much phase difference is found between said two signals $acc_{\theta_{dir}}$ and $acc_i z$. In this case, if said phase shift indicates a delay between said first sequence and said second sequence in the order, then $\theta=\theta_{dir}$, otherwise $\theta=\theta_{dir}+\pi$.

In a possible invention embodiment, this has been advantageously verified by the use of the calculation of the cross correlation. The test of possible phase difference between said two signals corresponds substantially to the confirmation (if the direction is confirmed) or invalidation (if instead it is necessary to choose the opposite direction) of the hypothesis concerning the fact of using a right-handed reference frames for all of said absolute reference systems, individual and device identified in the present method.

Also other embodiments of the method 400 may provide linear acceleration steps of calculation 410, of the window 440 update, for example by rotation of the raw acceleration value by a rotation matrix or by the use of a verification criterion of the direction, different from the use of cross-correlation, or by the use of other equivalent techniques preserving the general technical concept of the invention.

Specific Technical Advantages in Using the Formalism of Quaternions

Experimentally, the Inventors have verified that in some specific configurations of roll and pitch, the levelling by the defined quaternion $q_n$ further maximizes the variance along the direction of motion (decreasing the noise in the process of projection of the measured acceleration along the axis of motion), thereby improving the estimation of the angle $\theta_{dir}$ according to the method proposed by the present invention.

In particular, let us consider for example the numeric data, generated by a simulation using the simulation environment Matlab/Simulink and the 6DOF block (Quaternion) in aerospace Blockset™, relevant to a walk with the phone constantly kept in the attitude $$\text{conditions roll} = \frac{\pi}{6} \text{ rad,}$$
$$\text{pitch} = \frac{\pi}{4} \text{ rad and}$$
$$\text{yaw} = \frac{\pi}{2} \text{ rad}$$

with motion axis angle equal to $$\theta_{dir} = \frac{\pi}{3} \text{ rad.}$$

Using a discretization of straight angle with resolution $$\Delta\theta = \frac{\pi}{10} \text{ rad,}$$

the estimation error on the angle $\theta_{dir}$, by using, respectively, in the step of $acc_h$ acceleration determination, a standard rotation according to attitude $A_d$ and a rotation linked to the proposed quaternion $q_n$, comes out to be smaller in the second case (see FIG. 12). This experimental result shows the maximization of the variance along the direction of motion using the quaternion $q_n$ to obtain the acceleration $acc_h$.

Novelty and Advantages

In extreme synthesis, compared to the described conventional methods, the method subject-matter of the present invention presents the following differences:
- It allows to estimate the direction of motion of an individual or of a subject without tying said estimate to particular phenomena such as the recognition of a walking step or other type of pattern;
- It allows to set the desired degree of accuracy by defining the number of sectors in which the straight angle is split;
- It does not use heuristics for determining the direction of the actual direction of motion as other traditional methods do;

The possibility of setting a priori a level of accuracy in the estimation allows also to adjust the computing power necessary for the execution of the method.

From these differences the following advantages stem:
Independence of the correctness of the estimate with respect to the proper functioning of other methods such as those relating to the recognition of patterns;
Possibility to adjust the desired precision for the estimation of the direction and consequently the computational resources to be used;
Estimate is not depending on heuristics that in certain situations could lead to incorrect results.

The method of the above-mentioned patent document US2012136573A1 could provide a not exact projection onto the horizontal plane (because it is based on the hypothesis, not verified on-the-fly by the method, of coincidence between the gravitational axis and the axis of maximum variance in the accelerometer data). Such a problem does not occur in the method proposed in the present invention since the horizontal plane over which the individual moves is determined in an analytical way starting from the inertial data. In addition, the operation is computationally less expensive than the double exhaustive research proposed in the patent reported as prior art.

As regards the disambiguation of the direction, the proposed method is able to provide an estimate for each time window analyzed unlike the prior art that in many cases fails to update the estimate.

The thus conceived invention is susceptible to numerous modifications and variants, all falling within the scope of the appended claims.

Moreover, all the details may be replaced with other technically equivalent elements.

BIBLIOGRAPHY

SOH Madgwick et al. in "*Estimation of IMU and MARG orientation using a gradient descent algorithm*" published in proceeding of the IEEE International Conference on Rehabilitation Robotics (ICORR), 2011, ISBN 978-1-4244-9863-5.

F. L. Markley, J. L. Crassidis, Fundamentals of Spacecraft Attitude Determination and Control, Springer, 2014.

J. B. Kuipers, Quaternions & Rotation Sequences: A Primer with Applications to Orbits, Aerospace and Virtual Reality, Princeton University Press, 1999.

Where the constructional characteristics and techniques mentioned in the following claims are followed by reference signs or numbers, such signs and reference numbers have been applied with the sole purpose of increasing the intelligibility of the claims and, consequently, they do not constitute in any way a limitation to the interpretation of each element identified, purely by way of example, by such signs and reference numbers.

The invention claimed is:

1. Method for the estimation of an angle $\theta$ representing axis and direction of motion of an individual in a geomagnetic absolute Cartesian reference system North-East-Down $(X_a Y_a Z_a)$, to whom a Cartesian reference system $(X_i Y_i Z_i)$ of an individual carrying a device equipped with one or more inertia sensors is associated, the device being associated with a device Cartesian reference system $(X_d Y_d Z_d)$ and comprising at least one accelerometer and at least one magnetometer, the method being characterized in that it comprises the execution of the following steps:

A. splitting a straight angle into a set AS of n discrete angles $\theta_j$ with $j=1, \ldots, n$, where n is a positive integer;

B. measuring, at a given time instant t in a time window, in the device Cartesian reference system $(X_d Y_d Z_d)$, the device acceleration vector aced via said at least one accelerometer, and the local magnetic field vector $m=(m_x, m_y, m_z)$ by said magnetometer;

C. determining an attitude $A_d$ of said device based at least one the local magnetic vector m;

D. calculating, within the absolute Cartesian reference system $(X_a Y_a Z_a)$, the linear acceleration vector $acc_l = (acc_l x, acc_l y, acc_l z)$ to which said device is subjected during the motion of said individual, via the following substeps:

17

D1. rotating the device acceleration vector aced onto the horizontal plane $X_aY_a$ of said absolute reference system using the attitude $A_d$, obtaining a new vector of acceleration $acc_h$;

D2. subtracting a gravitational component $g=[0, 0, g_{za}\cong 9.81$ m/s$^2$, from the new vector of acceleration $acc_h$ of D1 step, obtaining a linear acceleration vector $acc_l$;

E. Building a linear accelerations matrix AQ as follows:

E1. calculating, for each angle $\theta_j \varepsilon AS$, the following function of the linear acceleration vector $acc_l$:

$$acc_{\theta j}=acc_lx*\cos(\theta_j)+acc_ly*\sin(\theta_j)$$

E2. appending a new column c containing at least said values $acc_{74_j}$, j=1, . . . , n, and the component $acc_lz$ of said vector $acc_l$ within a matrix AQ:

$$c=[acc_{\theta_1}, \ldots ,acc_{\theta_n}, acc_l z]^T$$

wherein steps B to E are repeated for successive time instants in said time window, and wherein the following further steps are carried out:

F. Calculating the variances of the $\{\sigma^2(acc_{\theta_1}), \ldots ,\sigma^2(acc_1 z)\}$ of the quantities stored in the rows of said accelerations matrix AQ;

G. estimating a discrete angle $\theta_{dir}$ of the direction axis of motion of said individual as:

$$\theta_{dir} = \arg\max_{\theta_j \in AS} \sigma^2(acc_{\theta_j})$$

H. determining said angle $\theta$ representing the axis and the direction of motion of an individual, according to the following sub-steps:

H1. Calculating $acc_{74_{dir}}$ a phase shift obtained by calculating a correlation index according to a deviation between reference values formed respectively by a first sequence and a second sequence, wherein both the first and second sequences are in said time window and the first sequence is obtained as $$acc_{\theta_{dir}}=acc_lx*\cos(\theta_{dir})+acc_ly*\sin(\theta_{dir})$$

and the second sequence is given by $$acc_l z;$$

wherein in said H1 step the phase shift is obtained by calculating a correlation index according to a deviation between the reference values formed by the row $acc_l z$ in the matrix AQ and the second sequence formed by the values $acc_{74_{dir}}$ obtained by extracting the row associated with $\theta_{dir}$ in the matrix AQ;

H1A. starting from the zero value of said deviation, identifying:
a first maximum value of the correlation index corresponding to a first deviation value, from among negative values of said deviation, and
a second maximum value of the correlation index corresponding to a second deviation value, from among positive values of said deviation; and H1B. determining the angle $\theta$ as follows:
If the absolute value of said first deviation value is less than or equal to the absolute value of said second deviation value, then $\theta=\theta_{dir}$;
If the absolute value of said first deviation value is greater than the absolute value of said second deviation value, then $\theta=\theta_{dir}+\pi$.

18

2. Method according to claim 1, wherein the attitude $A_d$ of step C is represented by a quaternion $q_d$ and in that the D1 step comprises the following substeps:

calculating a vector axis by carrying out a cross product of the gravitational vector $g=[0,0,g_{Za}]$ as expressed in said absolute Cartesian coordinate system $(X_aY_aZ_a)$ and said quaternion $q_d$, wherein a new gravitational vector $g_s$ is obtained by transforming the gravitational vector g from the absolute reference system $(X_aY_aZ_a)$ to the device reference system $(X_dY_dZ_d)$ using the following equations:

$$g_s = q_d \cdot g \cdot q_d^{-1}$$

$$axis = g \times g_s$$

where the term $q_d^{-1}$ is the conjugate of the quaternion $q_d$, the operator represents the product between quaternions, and in which the gravitational vector g has been converted from a three-dimensional vector to a four-dimensional vector by inserting a zero component;

calculating an angle $\phi$ between the two vectors g and $g_s$;

building a further quaternion $q_n$ from the values of axis and $\phi$;

rotating the vector $acc_d$ onto the horizontal plane $X_aY_a$ of said absolute reference system by said further quaternion $q_n$:

$$acc_h = \begin{bmatrix} acc_hx \\ acc_hy \\ acc_hz \end{bmatrix} = q_n^{-1} \cdot acc_d \cdot q_n$$

3. Method according to claim 1, wherein before step E2, the following sub-steps are executed:
determining a number of columns of matrix AQ or an extent of said time window; and
if the number of columns of matrix AQ or the extent of said time window is greater than a predetermined respective value, deleting the oldest column of said matrix AQ.

4. Method according to claim 1, wherein the calculation of the F step is carried out for each column appended in the E2 step.

5. Method according to claim 1, wherein a correlation index is calculated using the Pearson correlation index.

6. Method according to claim 1, wherein in step B a digital filtering is applied to the signals measured by said at least one accelerometer.

7. System for the estimation of an angle $\theta$ representing the axis and the direction of motion of an individual in an absolute Cartesian geomagnetic reference system North-East-Down $(X_aY_aZ_a)$, to whom an individual's Cartesian reference system $(X_i Y_i Z_i)$ is associated, the system comprising:

a device with one or more inertia sensors, the device being associated with a device Cartesian reference system $(X_dY_dZ_d)$ and comprising at least one accelerometer and at least one magnetometer, an electronic processor in data communication with said device;

a memory storing instructions configured to, when executed, cause said electronic processor to perform steps A-H of the method according to claim 1.

8. System according to claim 7, wherein said electronic processor is integrated in said device.

9. System according to claim 7, wherein said device is a smart phone or tablet or PDA equipped internally of at least one magnetic field sensor and at least an accelerometer, and said electronic processor is its CPU.

* * * * *